W. J. LILLY.
VALVE.
APPLICATION FILED AUG. 28, 1915.

1,208,590.

Patented Dec. 12, 1916.

WITNESSES
Edw. Thorpe.
Walton Harrison.

INVENTOR
William J. Lilly
BY
ATTORNEYS

UNITED STATES PATENT OFFICE.

WILLIAM J. LILLY, OF BUTTE, MONTANA.

VALVE.

1,208,590.

Specification of Letters Patent.     Patented Dec. 12, 1916.

Application filed August 28, 1915.   Serial No. 47,896.

*To all whom it may concern:*

Be it known that I, WILLIAM J. LILLY, a subject of the King of Great Britain, and a resident of Butte, in the county of Silverbow and State of Montana, have invented a new and Improved Valve, of which the following is a full, clear, and exact description.

My invention relates to valves suitable for use as throttle valves or cut-off valves, such, for instance, as are used in connection with hoisting engines and the like.

More particularly stated, I aim to produce a valve which is completely balanced, which is guided with great accuracy and which possesses a number of advantages hereinafter described.

Reference is made to the accompanying drawings forming a part of this specification, in which like letters indicate like parts.

Figure 2:
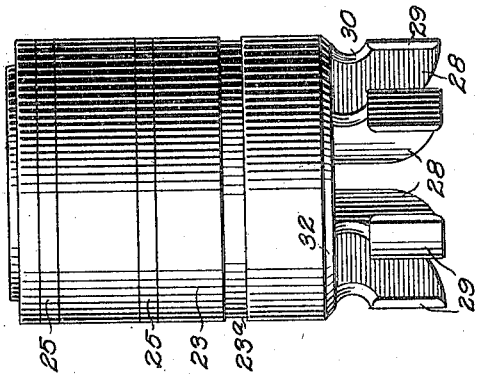
Figure 3:
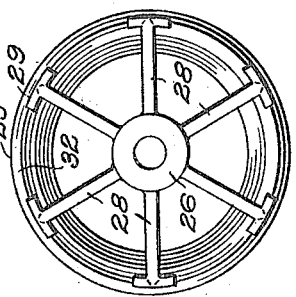
Figure 1:
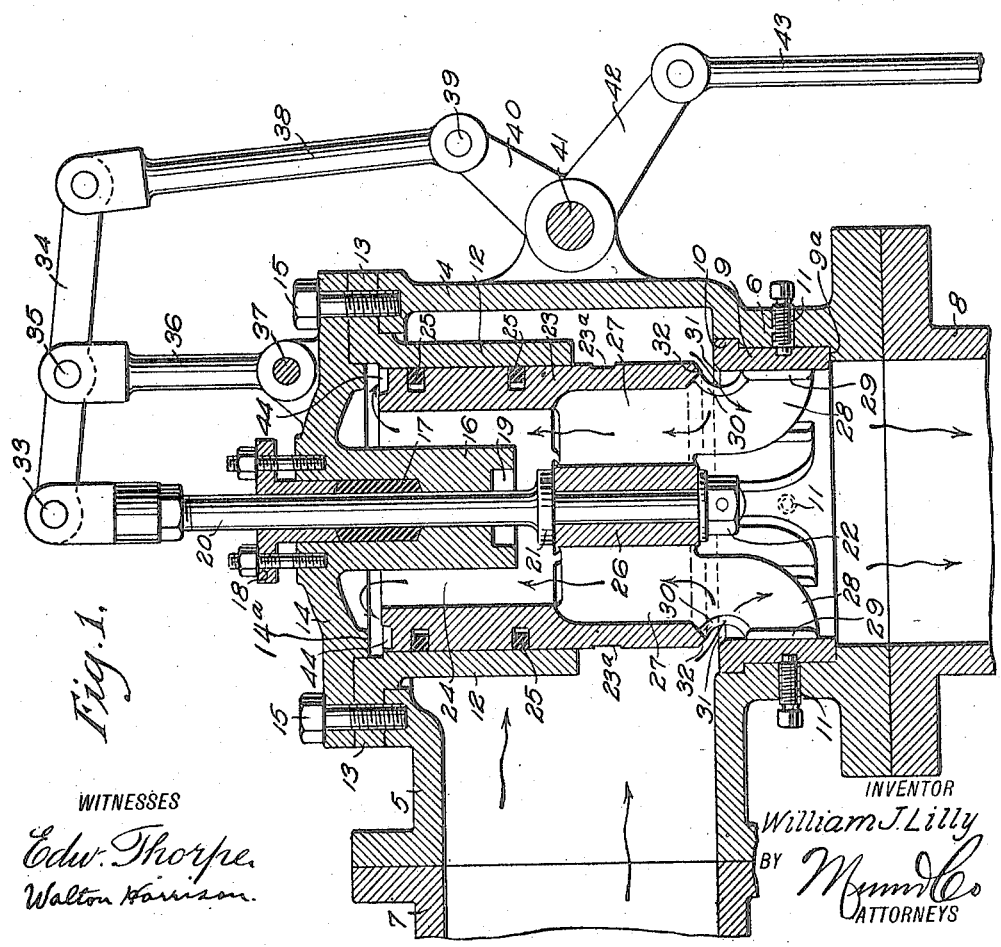

Figure 1 is a substantially central section through my improved valve; Fig. 2 is an elevation of the movable valve member; and Fig. 3 is an inverted plan or bottom view of the valve member.

A casing 4 having a substantially cylindrical form is provided with two necks 5—6 and connected with the latter are pipe sections 7—8. An annular member 9 serving as a seat ring is provided with an annular flange 10 and is engaged by a number of screws 11 which extend radially inward through the wall of the neck 6. The seat ring 9 rests upon an annular shoulder 9ª which it fits tightly, and is secured in place upon the shoulder 9ª by the screws 11.

A guide ring 12 is provided with an annular flange 13 and extends into the casing 4, the flange 13 resting upon the adjacent upper edge of the casing. A head 14 rests upon the flange 13 and is held in position by bolts 15 which extend through the flange 13 and engage the casing 4. The head 14 has on its inner face a flange 14ª engaging the ring 12 and carries a portion 16 having the proximate form of a cylinder, this portion carrying a stuffing box 17 and a gland 18. The cylindrical member 16 is provided with a recess 19. A valve stem 20 extends through the cylindrical member 16 and is provided with an annular flange 21 which is adapted to fit into the recess 19 when the valve stem reaches the upper limit of its travel. The recess 19 and the flange 21 of the valve stem form a cushioning means for the valve. The valve stem at its lower end carries a nut 22. A valve member is shown at 23 and has a proximate general form of a cylinder. It is provided with an annular groove 23ª and is slidably mounted within the guide ring 12. The groove 23ª is for the purpose of preventing the valve member from being worn or abraded by the bottom edge of the guide rings 12 under working conditions. The valve member 23 is provided with an opening 24 extending entirely through it in the direction of its axis. The valve member is further provided with packings 25 which have the form of a ring and engaging the adjacent inner surface of the guide ring 12.

Integral with the valve member are a number of ribs 27 and a hub 26. The ribs 27 are provided with downwardly extending portions 28 carrying contact sectors 29, the latter slidably engaging the adjacent inner surface of the seat ring 9. These downwardly extending portions of the ribs are provided with inwardly curved beveled edges 30 for the purpose of clearing the adjacent upper edge of the seat ring 9 when the parts are in the position indicated in Fig. 1. The purpose in providing the beveled edges 30 is to give free passage to the flow of steam through the valve. The upper adjacent edge of the seat ring 9 is provided with an annular shoulder 31 which is inclined and has a frusto-conical form. The valve member 23 carries a shoulder 32 having also a frusto-conical form and adapted to fit neatly against the shoulder 31 whenever the valve member 23 occupies its lowermost position; that is to say, the valve member 23 is seated by moving it downwardly until the shoulder 32 rests upon the shoulder 31. The valve stem 20 at its upper end carries a pivot pin 33 by which it is connected to a lever 34. This lever is mounted to rock upon a pin 35 carried at the upper end of the link 36, this link being mounted to rock slightly upon a pin 37 carried by the casing head 14.

The outer or free end of the lever 34 is pivotally connected to a rod 38 and the lower end of this rod is pivotally connected by a pin 39 to a bell crank 40. This bell crank is mounted upon a pivot pin 41 supported by the casing, and is provided with a portion 42 extending outwardly and connected to a rod 43. This rod 43 by movement in the general direction of its length controls the vertical movement of the valve member 23.

The seating of the valve member 23 upon the seat ring 9 is such as to prevent any leakage past the joint formed for the time being between the shoulders 31 and 32. The valve member 23 cannot stick upon the seat, and when raised relatively to it the steam or other elastic fluid flows freely between the shoulders 31 and 32, to the extent that the valve member is moved relatively to the seating ring, owing to the curvature of the edges of the portions 28 of the ribs 27, the inflow of the elastic fluid is distributed equally all around the valve member. There is, therefore, no binding of the valve member due to any accidental lack of balance between the pressure of the elastic medium between different points where the pressure is applied.

As indicated by the arrows in Fig. 1, the pressure of the elastic medium upon the top of the valve member must, in the aggregate, be equal to the pressure upon the bottom of the valve member, hence, the movement of the valve member toward and from its seat and also its engagement with and its disconnection from the seat are accomplished with a minimum of effort in the shape of energy expended to operate the valve. The valve member 23 at its upper end is provided with an annular recess 44, and the steam or other elastic medium employed passes freely into this recess. The recess 44 coöperates with the flange 14ª of the head to form cushioning means for the valve member when the said valve reaches the limit of its upward movement.

The inside diameter of the guide ring 12 is the same as the maximum diameter of the shoulder 31; that is, the diameter of this shoulder at its upper edge. This fact, together with the distribution of the elastic fluid within the valve member insures an exact balance of the valve member.

No matter how quickly the steam or other elastic medium may be turned on, either at the valve or at any other point, the rush of the elastic medium into and through the valve, as indicated by arrows in Fig. 1, causes the upward pressure of the elastic medium against any and all portions of the valve member to be exactly balanced by the downward pressure of the elastic medium upon other portions of the valve member.

The guide ring 12 being separate from the casing 4 and from the head 14, may be removed and replaced at the will of the operator.

I do not limit myself to the precise construction shown, as variations may be made therefrom without departing from the spirit of my invention.

Having thus described my invention what I claim as new and desire to secure by Letters Patent, is as follows:

1. In a valve, a casing having a valve seat adjacent its lower end and provided with a guide ring projecting from its upper end, a hollow open ended elongated cylindrical valve guided in said ring and adapted to seat with its lower end on the valve seat, said valve being provided at its lower end with a central member and radial ribs connecting the member with the valve, said ribs extending downward below the lower end of the valve into the valve seat and having sector-shaped faces engaging the inner face of the said seat, said ribs having curved recesses at the lower end of the valve and means connected with the said member of the valve for operating it.

2. In a valve, a casing having a valve seat adjacent its lower end, a guide ring resting on the upper end of the casing and projecting into the same, a head resting upon the guide ring and having a flange engaging the inner face of the ring, a hollow open ended cylindrical valve slidably mounted in the ring adapted to seat with its lower end on the valve seat, said valve having an annular groove in its upper end coöperating with the flange of the head to form cushioning means and provided with a central member and radial ribs connecting the member with the valve, said ribs projecting below with the valve into the valve seat and engaging the same, and means connected with the said member of the valve for operating it.

3. In a valve, a casing having a head provided with a tubular member projecting into the casing, said casing having a valve seat at its lower end, a guide ring having a flange extending between the head and casing and projecting into the upper end of said casing, a hollow open ended cylindrical valve guided in said ring and adapted to seat with its lower end on the valve seat, said valve being provided with a central hub and radial ribs connecting the hub with the valve, said ribs having curved recesses adjacent the lower end of the valve and projecting below the valve into the valve seat and having sector-shaped surfaces engaging the valve seat, a valve stem secured to the hub of the valve and extending out through the tubular member of the head of the valve casing, and means for operating said valve stem.

4. In a valve, a casing having a head provided with a tubular member projecting into the casing and having a recess in its inner end, said casing having a valve seat at its lower end and a guide ring projecting into its upper end, a hollow open ended cylindrical valve slidably mounted in said ring and adapted to seat with its lower end on the valve seat, said valve being provided with a central hub and radial ribs connecting the hub with the valve, said ribs projecting below the lower end of the valve into the valve seat and engaging the same, a valve stem secured to the hub of the valve and extending out through the tubular member of the head of the casing, said valve stem having a flange resting on the said hub and adapted to enter the recess of the tubular member of the head of the casing, and means connected with the stem for operating it.

In testimony whereof I have signed my name to this specification in the presence of two subscribing witnesses.

WILLIAM J. LILLY.

Witnesses:
W. E. CARPENTER,
NEIL G. McLEOD.

Copies of this patent may be obtained for five cents each, by addressing the "Commissioner of Patents, Washington, D. C."